No. 677,378. Patented July 2, 1901.
C. STONE.
BICYCLE TIRE.
(Application filed Apr. 23, 1901.)
(No Model.)

Witnesses
Columbus Stone, Inventor.

UNITED STATES PATENT OFFICE.

COLUMBUS STONE, OF MANCHESTER, TENNESSEE, ASSIGNOR OF ONE-HALF TO CHARLES E. RODES, OF SAME PLACE.

BICYCLE-TIRE.

SPECIFICATION forming part of Letters Patent No. 677,378, dated July 2, 1901.

Application filed April 23, 1901. Serial No. 57,137. (No model.)

*To all whom it may concern:*

Be it known that I, COLUMBUS STONE, a citizen of the United States, residing at Manchester, in the county of Coffee and State of Tennessee, have invented a new and useful Bicycle-Tire, of which the following is a specification.

This invention relates to bicycle-tires; and it has for its object to provide a tire which will have the elastic and resilient properties of the pneumatic tire and which will not be injured by puncture, the tire being adapted for use in connection with any other vehicle desired.

A further object of the invention is to provide a sustaining-lining of such shape as will prevent flattening of the tire and which will insure the tire returning to its normal shape when pressure thereon is removed.

Figure 1:
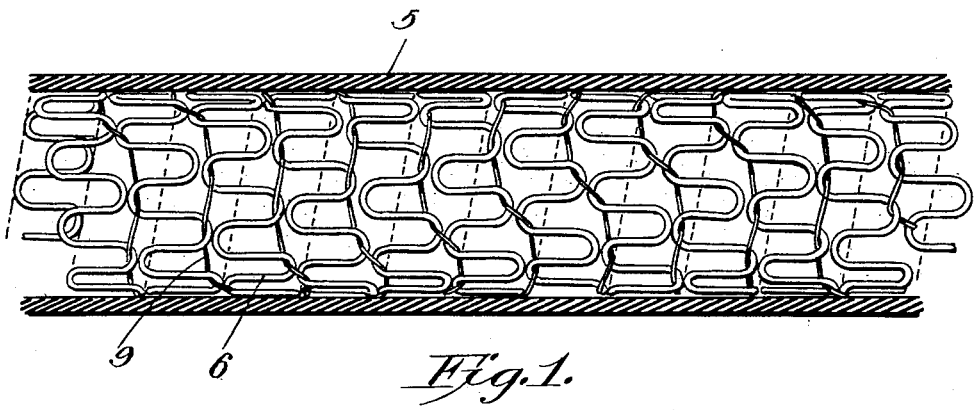
Figure 2:
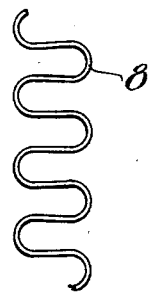

In the drawings forming a portion of this specification, and in which like numerals of reference indicate similar parts in the several views, Figure 1 is a view showing a longitudinal section of a portion of a vehicle-tire equipped in accordance with the present invention, the helical-spring lining being shown in elevation and the farther sides of the convolutions of the helix being indicated in dotted lines. Fig. 2 is an elevation showing a section of the wire tape from which the helix is wound.

Referring now to the drawings, there is shown a portion of a hollow or tubular tire 5, which may be of rubber and fabric, after the manner of the ordinary pneumatic tire, or may be of leather or other material that will readily respond to pressure thereagainst, the diameter of the tire being whatever may be desired, according to the use to which the tire is to be put. Instead of filling this tire with compressed air or other fluid a helical spring 6 is inserted therein, this spring having its ends joined, so that it extends throughout the length of the tube.

It will be noted that the diameter of the helix is equal to the interior diameter of the tire and that the outer faces of the successive convolutions of the helix are in contact continuously with the inner face of the tire.

The helix is wound from a ribbon 8, formed of a single length of spring-wire that is curved backwardly and forwardly to give a corrugated form thereto, and the ribbon is so wound that the out or end curves of the corrugations of one convolution lie against the corresponding end curves of the adjacent corrugation, and to hold the convolutions in this relation a wire 9 is laced in substantially a helical form through the adjacent ends of the corrugations in the ribbon, certain of the corrugations being skipped, so as to give greater freedom of movement to the helical spring formed. It is found that in a helical spring formed in this manner there is a maximum resistance to falling over of the convolutions, and this action is further prevented by the possible arrangement of the lacing-wire around the bends of the ribbon, and at the same time there is a maximum of surface of the spring in contact with the tube, so that it is sustained with efficiency.

It will be understood that the lacing-wire may be passed longitudinally of the helix or that an additional wire may be used and passed longitudinally of the helix and that other modifications of the specific construction shown may be made without departing from the spirit of the invention.

What is claimed is—

1. A vehicle-tire comprising a tube having a helical spring disposed therein and in contact with the inner periphery thereof, and warp-wires interwoven transversely with the convolutions of the helix to hold them from falling over.

2. A vehicle-tire comprising a tube, a corrugated wire bent into spiral form and disposed within the tube and with the wire in continuous contact with the inner surface of the tube, and a transverse lacing-wire engaged with certain corrugations of adjacent convolutions of the spiral to hold the convolutions from falling over.

In testimony that I claim the foregoing as my own I have hereto affixed my signature in the presence of two witnesses.

COLUMBUS STONE.

Witnesses:
W. JOHNSON,
L. M. ROBINSON.